United States Patent
Kishino et al.

(10) Patent No.: US 12,155,725 B2
(45) Date of Patent: Nov. 26, 2024

(54) SENSOR NODE, SERVER APPARATUS, IDENTIFICATION SYSTEM, METHOD AND PROGRAM

(71) Applicant: NIPPON TELEGRAPH AND TELEPHONE CORPORATION, Tokyo (JP)

(72) Inventors: Yasue Kishino, Tokyo (JP); Yoshinari Shirai, Tokyo (JP); Shin Mizutani, Tokyo (JP); Takuma Otsuka, Tokyo (JP); Takayuki Suyama, Tokyo (JP); Futoshi Naya, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 454 days.

(21) Appl. No.: 17/424,463

(22) PCT Filed: Jan. 15, 2020

(86) PCT No.: PCT/JP2020/001108
§ 371 (c)(1),
(2) Date: Jul. 20, 2021

(87) PCT Pub. No.: WO2020/153202
PCT Pub. Date: Jul. 30, 2020

(65) Prior Publication Data
US 2022/0109727 A1    Apr. 7, 2022

(30) Foreign Application Priority Data
Jan. 23, 2019   (JP) ................................ 2019-009586

(51) Int. Cl.
*H04L 67/12*      (2022.01)
*G06N 20/00*      (2019.01)
(Continued)

(52) U.S. Cl.
CPC ............. *H04L 67/12* (2013.01); *G06N 20/00* (2019.01); *G16Y 40/10* (2020.01); *G16Y 40/35* (2020.01)

(58) Field of Classification Search
None
See application file for complete search history.

(56) References Cited

U.S. PATENT DOCUMENTS

2016/0267325 A1*  9/2016  Sundaresan ............ G06T 7/215
2017/0277716 A1*  9/2017  Giurgiu .................. G06F 16/29
(Continued)

FOREIGN PATENT DOCUMENTS

JP    2018193193 A    12/2018

OTHER PUBLICATIONS

Burr Settles (2010) "Active Learning Literature Survey" Computer Sciences Technical Report 1648, Jan. 26, 2010, pp. 1-65.

*Primary Examiner* — Chris Parry
*Assistant Examiner* — Abderrahmen Chouat

(57) ABSTRACT

A sensor node connected to a server device through a communication network includes an acquisition unit configured to acquire sensor data from a sensor included in the sensor node, an identification unit configured to classify the sensor data into a plurality of classes to identify occurrence of a predetermined event based on the sensor data and an identification model created by the server device in advance, a certainty degree calculation unit configured to calculate a degree of certainty of the sensor data as an indicator representing uncertainty of a result of the identification based on the result of the identification, and a transmission unit configured to select sensor data having a minimum degree of certainty from a transmission buffer in which the sensor data
(Continued)

and the degree of certainty of the sensor data are stored in association with each other, and transmit the selected sensor data to the server device.

5 Claims, 10 Drawing Sheets

(51) Int. Cl.
    *G16Y 40/10*     (2020.01)
    *G16Y 40/35*     (2020.01)

(56) References Cited

U.S. PATENT DOCUMENTS

| | | | |
|---|---|---|---|
| 2018/0261020 A1* | 9/2018 | Petousis | G07C 5/0841 |
| 2018/0314921 A1* | 11/2018 | Mercep | G01S 15/86 |
| 2018/0338033 A1* | 11/2018 | Boule | G01S 19/52 |
| 2019/0051172 A1* | 2/2019 | Stenneth | G08G 1/163 |
| 2019/0295003 A1* | 9/2019 | Dronen | G05D 1/0221 |
| 2020/0191914 A1* | 6/2020 | Kunz | G01S 7/4808 |
| 2021/0081688 A1* | 3/2021 | Bazargan | G06V 40/10 |

* cited by examiner

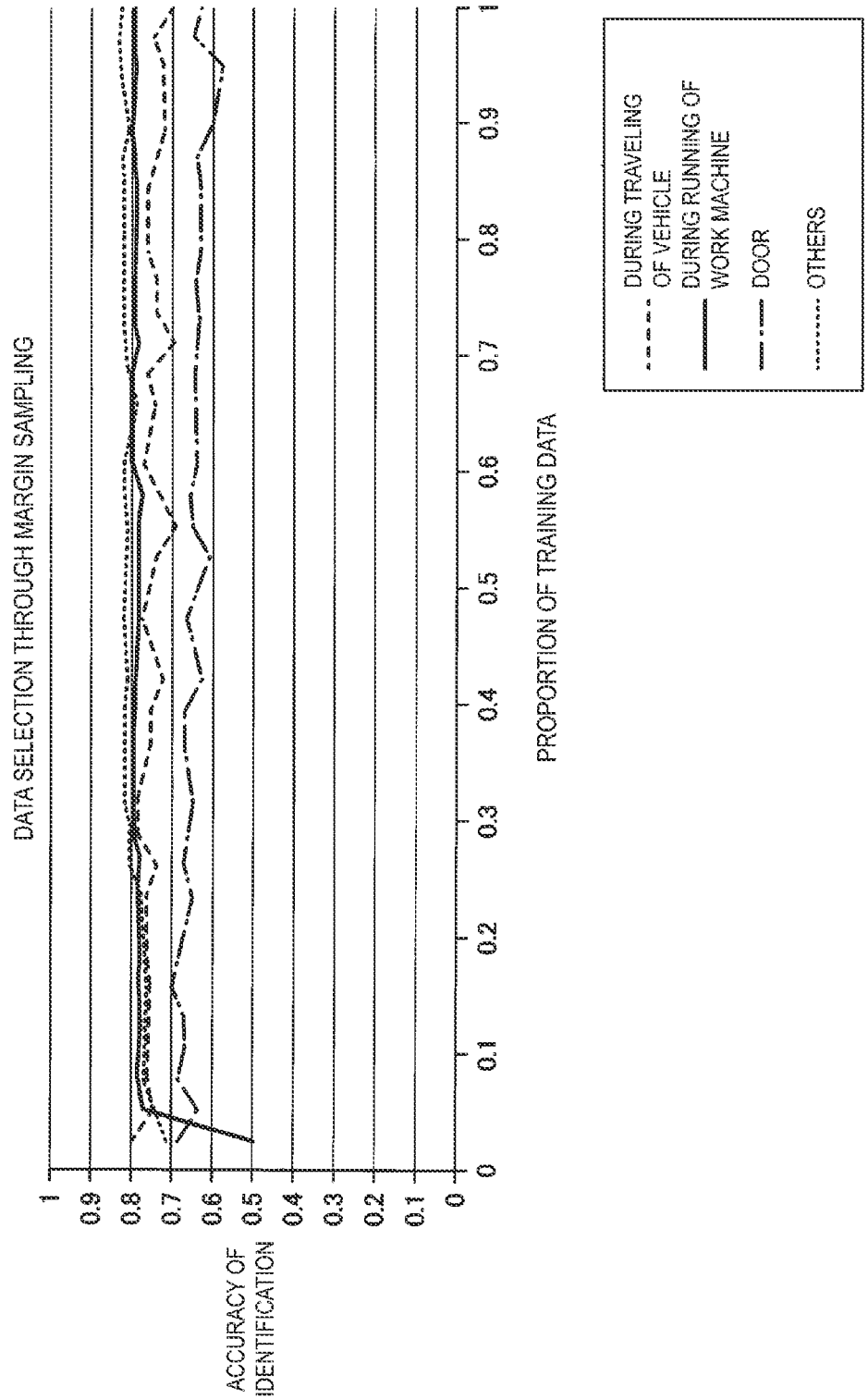

SENSOR NODE, SERVER APPARATUS, IDENTIFICATION SYSTEM, METHOD AND PROGRAM

CROSS-REFERENCE TO RELATED APPLICATIONS

This application is a U.S. 371 Application of International Patent Application No. PCT/JP2020/001108, filed on 15 Jan. 2020, which application claims priority to and the benefit of JP Application No. 2019-009586, filed on 23 Jan. 2019, the disclosures of which are hereby incorporated herein by reference in their entireties.

TECHNICAL FIELD

The present disclosure relates to a sensor node, a server device, an identification system, a method, and a program.

BACKGROUND ART

A technique called environmental sensing for installing sensor nodes in various environments and identifying circumstances of the environments, events occurring in the environments, and the like using sensor data obtained from the sensor nodes is known. For example, a technique for identifying a garbage collection section using sensor data obtained from a motion sensor mounted on a garbage cleaning vehicle is known (Patent Literature 1). In addition, for example, a technique for identifying an action of a person using sensor data or identifying whether or not an abnormality has occurred in an object, and the like are also known.

In the actual operation of environmental sensing, a sensor node including a battery-powered wireless communication module is generally used. In such a sensor node, an identification model for identifying an event or the like often is held in a memory or the like, and only identification results using the identification model are transmitted to a server or the like, in order to minimize power consumption and the amount of communication. Note that the identification model is created by a supervised learning method using training data obtained by labeling (annotating) the sensor data.

On the other hand, it is known that the accuracy of identification may be reduced due to various factors such as changes in the environment in which a sensor node is installed, deterioration of the sensor node, a positional deviation of the sensor node, and change of a driver in a vehicle on which the sensor node is mounted. For this reason, it is necessary to create a new identification model in accordance with the occurrence of these factors and then update the identification model in which the sensor node is held.

Here, a method called active learning for selecting data with a good learning effect at the time of creating training data by labeling data used for supervised learning is known (Non Patent Literature 1).

CITATION LIST

Patent Literature

Patent Literature 1: Japanese Unexamined Patent Application Publication No. 2018-193193

Non Patent Literature

Non Patent Literature 1: Burr Settles, "Active Learning Literature Survey", Computer Sciences Technical Report 1648, University of Wisconsin-Madison (2010)

SUMMARY OF THE INVENTION

Technical Problem

Incidentally, while an identification model is generally created by a server or the like having a relatively large amount of computational resources, it is preferable that the amount of communication at the time of transmitting sensor data to be labeled to the server or the like be minimized as far as possible in consideration of the amount of power consumption, a communication band, and the like of a sensor node. In addition, labeling of sensor data is generally performed manually, which results in high manpower costs in a case where there are a large number of pieces of sensor data to be labeled.

On the other hand, it is considered that it is possible to minimize the amount of communication and manpower costs incurred for labeling while maintaining the accuracy of identification of an identification model by selecting sensor data having a good learning effect at the time of creating an identification model and transmitting the selected sensor data to a server or the like as a labeling target by using the above-described active learning method.

The present disclosure is contrived in view of the above-describe circumstances, and an object thereof is to reduce the amount of communication of data to be labeled and the costs incurred for labeling.

Means for Solving the Problem

In order to achieve the above-described object, a sensor node according to an embodiment of the present disclosure is a sensor node connected to a server device through a communication network and including an acquisition unit configured to acquire sensor data from a sensor included in the sensor node, an identification unit configured to classify the sensor data into a plurality of classes to identify occurrence of a predetermined event based on the sensor data and an identification model created by the server device in advance, a certainty degree calculation unit configured to calculate a degree of certainty of the sensor data as an indicator representing an uncertainty of a result of the identification based on the result of the identification, and a transmission unit configured to select sensor data having a minimum degree of certainty from a transmission buffer in which the sensor data and the degree of certainty of the sensor data are stored in association with each other, and transmit the selected sensor data to the server device.

In addition, a server device according to an embodiment of the present disclosure is a server device connected to one or more sensor nodes through a communication network and including a reception unit configured to receive sensor data from detection by each of the sensor nodes and receive indicators when the sensor data is classified into a plurality of classes by an identification model in the sensor node to identify occurrence of a predetermined event, a storage unit configured to rank the sensor data in ascending order or descending order of the indicators and store the ranked sensor data in a memory unit, a presentation unit configured to present the ranked sensor data to a user as a labeling target, an additional learning unit configured to perform additional learning of an identification model for identifying occurrence of the event in the sensor node using the sensor data labeled by the user, and a transmission unit configured to transmit the identification model having been subjected to the additional learning to the sensor node as an identification model for updating the identification model held by the sensor node.

In addition, an identification system according to an embodiment of the present disclosure is an identification system including a server device, and one or more sensor nodes connected to the server device through a communication network, in which each of the sensor nodes includes an acquisition unit configured to acquire sensor data from a sensor included in the sensor node, an identification unit configured to classify the sensor data into a plurality of classes to identify occurrence of a predetermined event based on the sensor data and an identification model created by the server device in advance, a certainty degree calculation unit configured to calculate a degree of certainty of the sensor data as an indicator representing an uncertainty of a result of the identification based on the result of the identification, and a transmission unit configured to select sensor data having a minimum degree of certainty from a transmission buffer in which the sensor data and the degree of certainty of the sensor data are stored in association with each other, and transmit the selected sensor data and the degree of certainty of the sensor data to the server device, and the server device includes a reception unit configured to receive the sensor data and the degree of certainty of the sensor data from the sensor node, a storage unit configured to rank the sensor data in ascending order or descending order of the degrees of certainty and store the ranked sensor data in a memory unit, a presentation unit configured to present the ranked sensor data to a user as a labeling target, an additional learning unit configured to perform additional learning of the identification model in the sensor node using the sensor data labeled by the user, and a transmission unit configured to transmit the identification model having been subjected to the additional learning to the sensor node as an identification model for updating the identification model held by the sensor node.

Effects of the Invention

It is possible to reduce the amount of communication of data to be labeled and costs incurred for labeling.

BRIEF DESCRIPTION OF DRAWINGS

FIG. 10B is a diagram illustrating an example of effects of the present disclosure.

DESCRIPTION OF EMBODIMENTS

Hereinafter, an embodiment of the present disclosure will be described with reference to the drawings. In the embodiment of the present disclosure, description will be given of an identification system 1 capable of minimizing the amount of communication of sensor data to be labeled and manpower costs incurred for labeling while maintaining the accuracy of identification of an updated identification model by selecting sensor data at the time of creating an identification model using an active learning method.

Here, in environmental sensing, it is determined into which class among a plurality of classes sensor data is classified (or a probability that sensor data is classified into each class, and the like are calculated) to identify an event and a situation occurring in a predetermined target, a state, an action, and the like. In the following embodiment of the present disclosure, the event, the state, the action, and the like are collectively referred to as "events."

Specifically, for example, in a case where any machine is set as a target and it is identified whether or not a failure has occurred in the target, occurrence of a failure and non-occurrence of a failure are equivalent to events. In addition, for example, in a case where a vehicle is set as a target and it is identified in which situation among "traveling", "stopping", "door opening and closing," and "others" the vehicle is in, the "traveling", the "stopping", the "door opening and closing," and the "others are equivalent to events.

Note that labeling is to impart a label (that is, correct answer data or teacher data) indicating to which class sensor data belongs to the sensor data. By imparting a label to the sensor data, training data used to create an identification model is obtained.

In addition, any machine learning model is appropriately used as an identification model in accordance with, for example, an event or the like to be identified. As an example, a deep neural network (DNN), a support vector machine (SVM), or the like can be used as an identification model.

Overall Configuration

Figure 1:
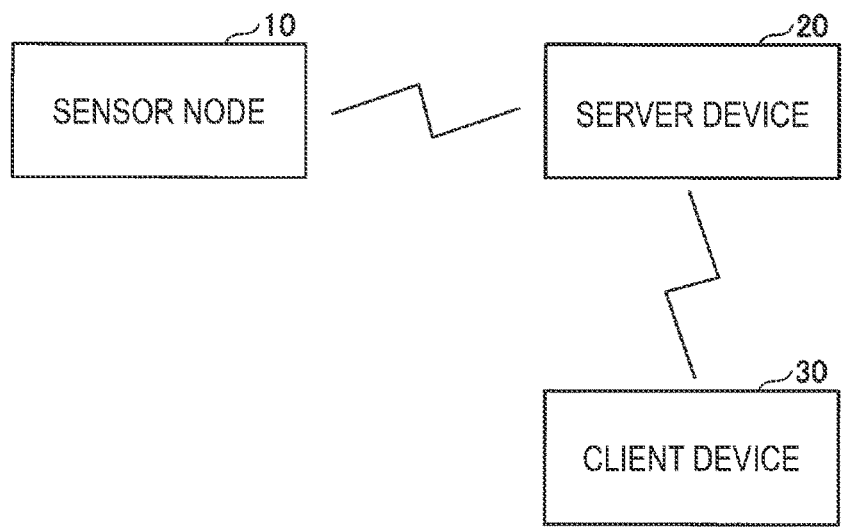
FIG. 1 is a diagram illustrating an example of an overall configuration of an identification system according to an embodiment of the present disclosure.

First, an identification system 1 according to an embodiment of the present disclosure will be described with reference to FIG. 1. FIG. 1 is a diagram illustrating an example of an overall configuration of the identification system according to the embodiment of the present disclosure.

As illustrated in FIG. 1, the identification system 1 according to the embodiment of the present disclosure includes one or more sensor nodes 10, a server device 20, and a client device 30. The sensor nodes 10 and the server device 20 are communicatively connected to each other, for example, by wireless communication. In addition, the server device 20 and the client device 30 are communicatively connected to each other, for example, by wireless or wired communication or both. Note that the sensor nodes 10 and the server device 20 may be communicatively connected to each other, for example, by wired communication, or may be communicatively connected to each other by both wireless communication and wired communication.

The sensor node 10 senses a predetermined target by a sensor. The sensor node 10 identifies an event using sensor data obtained through the sensing and an identification model, and transmits an identification result to the server device 20. In addition, the sensor node 10 selects sensor data to be labeled using an active learning method and then transmits the selected sensor data to the server device 20. Here, it is assumed that the sensor node 10 uses a degree of certainty of the sensor data to select sensor data to be labeled. The degree of certainty is an indicator that represents the accuracy of identification at the time of identifying sensor data, and it can be expected that a learning effect at the time of creating an identification model will become higher as the degree of certainty of sensor data increases. In other words, the degree of certainty is an indicator that represents the uncertainty of an identification result at the time of identifying sensor data. A specific example of the degree of certainty will be described later.

Note that what kind of sensor the sensor node 10 includes depends on a sensing target, an event to be identified, or the like, but it is assumed that the sensor node 10 includes a predetermined number of predetermined sensors in accordance with a sensing target, an event to be identified, or the like.

The server device 20 receives identification results and sensor data to be labeled from the sensor node 10. In addition, the server device 20 ranks sensor data to be labeled in ascending order of the degree of certainty (that is, in descending order of a learning effect) and then transmits the ranked sensor data to the client device 30.

In addition, the server device 20 creates an identification model using training data (that is, labeled sensor data) and transmits the identification model to the sensor node 10. Thereby, an identification model held by the sensor node 10 is updated. Note that an identification model used to update the identification model held by the sensor node 10 will also be referred to as an "update model" below.

The client device 30 is a terminal device operated by a user and performs labeling on sensor data in response to the user's operation. Thereby, training data for creating an update model is obtained. As the client device 30, for example, a personal computer (PC), a smartphone, a tablet terminal, or the like may be used.

Note that the configuration of the identification system 1 illustrated in FIG. 1 is an example, and other configurations may be adopted. For example, the server device 20 and the client device 30 may be configured integrally. In this case, the user may operate a device in which the server device 20 and the client device 30 are integrally configured to perform labeling on sensor data.

Hardware Configuration

Next, hardware configurations of the sensor node 10, the server device 20, and the client device 30 included in the identification system 1 according to the embodiment of the present disclosure will be described.

Sensor Node 10

Figure 2:
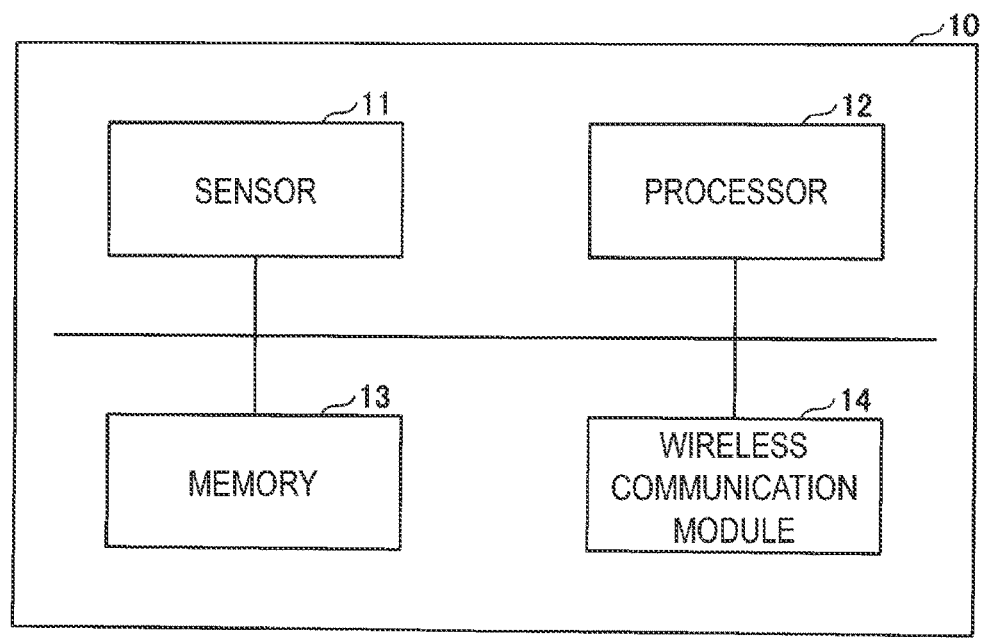
FIG. 2 is a diagram illustrating an example of a hardware configuration of a sensor node according to the embodiment of the present disclosure.

The sensor node 10 according to the embodiment of the present disclosure has, for example, a hardware configuration illustrated in FIG. 2. FIG. 2 is a diagram illustrating an example of a hardware configuration of the sensor node 10 according to the embodiment of the present disclosure.

As illustrated in FIG. 2, the sensor node 10 according to the embodiment of the present disclosure includes a sensor 11, a processor 12, a memory 13, and a wireless communication module 14 as hardware.

The sensor 11 is a sensor corresponding to an event to be sensed or identified by the sensor node 10, or the like. Any sensor can be used as the sensor 11. Note that examples of representative sensors include a motion sensor, an acceleration sensor, an atmospheric pressure sensor, a temperature sensor, an ultrasonic sensor, an image sensor, a sound sensor, and the like.

The processor 12 is, for example, a central processing unit (CPU), a micro processing unit (MPU), or the like, and is an arithmetic device that reads a program or data from the memory 13 to execute processing. The memory 13 is a storage device that memorizes various programs and data and is used as a work area of the processor 12.

The wireless communication module 14 is an interface for wirelessly performing data communication with other devices (for example, the server device 20 and the like).

The sensor node 10 according to the embodiment of the present disclosure has the hardware configuration illustrated in FIG. 2 and thus can implement various processing to be described later.

Server Device 20 and Client Device 30

Figure 3:
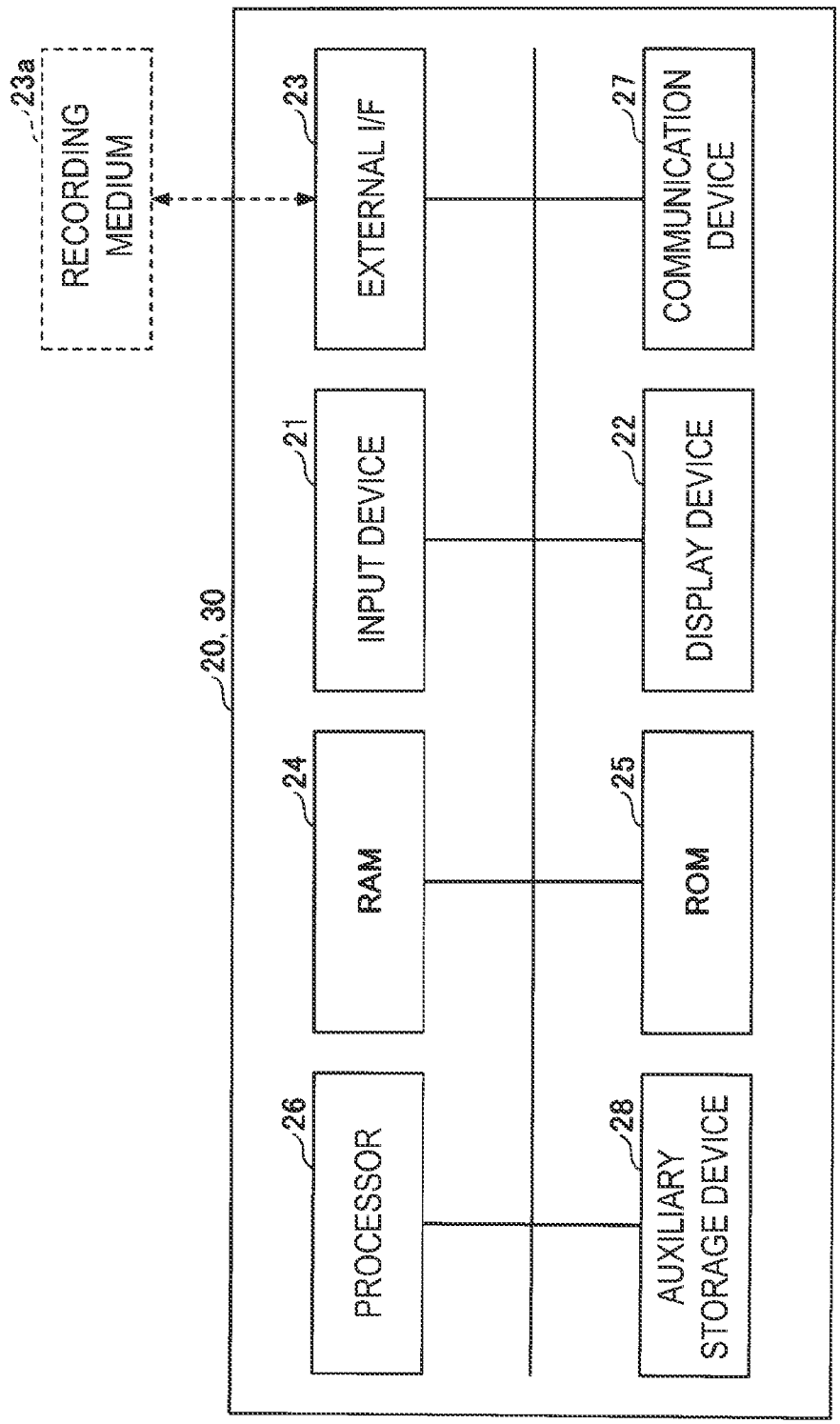
FIG. 3 is a diagram illustrating an example of a hardware configuration of a server device and a client device according to the embodiment of the present disclosure.

The server device 20 and the client device 30 according to the embodiment of the present disclosure may have, for example, hardware configurations illustrated in FIG. 3. FIG. 3 is a diagram illustrating an example of hardware configurations of the server device 20 and the client device 30 according to the embodiment of the present disclosure. Note that the server device 20 and the client device 30 can be implemented by a similar hardware configuration, and thus the hardware configuration of the server device 20 will be mainly described below.

As illustrated in FIG. 3, the server device 20 according to the embodiment of the present disclosure includes an input device 21, a display device 22, an external I/F 23, a random access memory (RAM) 24, a read only memory (ROM) 25, a processor 26, a communication device 27, and an auxiliary storage device 28 as hardware.

The input device 21 may be, for example, a keyboard, a mouse, a touch panel, or the like, and is used to input various operations by the user. The display device 22 may be, for example, a display or the like, and displays various processing results and the like. Note that the server device 20 may not include at least one of the input device 21 and the display device 22.

The external I/F 23 is an interface for connection to an external device. Examples of the external device include a recording medium 23a, and the like. The server device 20 can perform reading, writing, or the like on the recording medium 23a through the external I/F 23. Examples of the recording medium 23a include a flexible disk, a compact disc (CD), a digital versatile disk (DVD), a secure digital (SD) memory card, a universal serial bus (USB) memory card, and the like.

The RAM 24 is a volatile semiconductor memory that temporarily stores programs and data. The ROM 25 is a non-volatile semiconductor memory capable of storing programs and data even when a power supply is turned off. The ROM 25 may store, for example, setting information regarding an operating system (OS), setting information regarding communication, or the like.

The processor 26 may be, for example, a CPU or the like and is an arithmetic device that reads programs and data from the ROM 25, the auxiliary storage device 28, or the like and stores the read programs and data in the RAM 24 to execute processing. The communication device 27 is an interface device for performing data communication with other devices.

The auxiliary storage device 28 may be, for example, a hard disk drive (HDD), a solid state drive (SSD), or the like, and is a non-volatile storage device that stores programs and data. The programs and data stored in the auxiliary storage device 28 may include, for example, an OS, application programs that implement various functions on the OS, and the like.

The server device 20 and the client device 30 according to the embodiment of the present disclosure may have hardware configurations illustrated in FIG. 3 to implement various processes to be described later. Note that a case where each of the server device 20 and the client device 30 according to the embodiment of the present disclosure is implemented by one device (computer) is illustrated in the example illustrated in FIG. 3, but the present disclosure is not limited to this case. At least one of the server device 20 and the client device 30 according to the embodiment of the present disclosure may be implemented by a plurality of devices (computers). In addition, a plurality of processors 26 and a plurality of storage devices (the RAM 24, the ROM 25, the auxiliary storage device 28, and the like) may be included in one device (computer).

Outline of Event Identification and Updating of Identification Model

Figure 4:
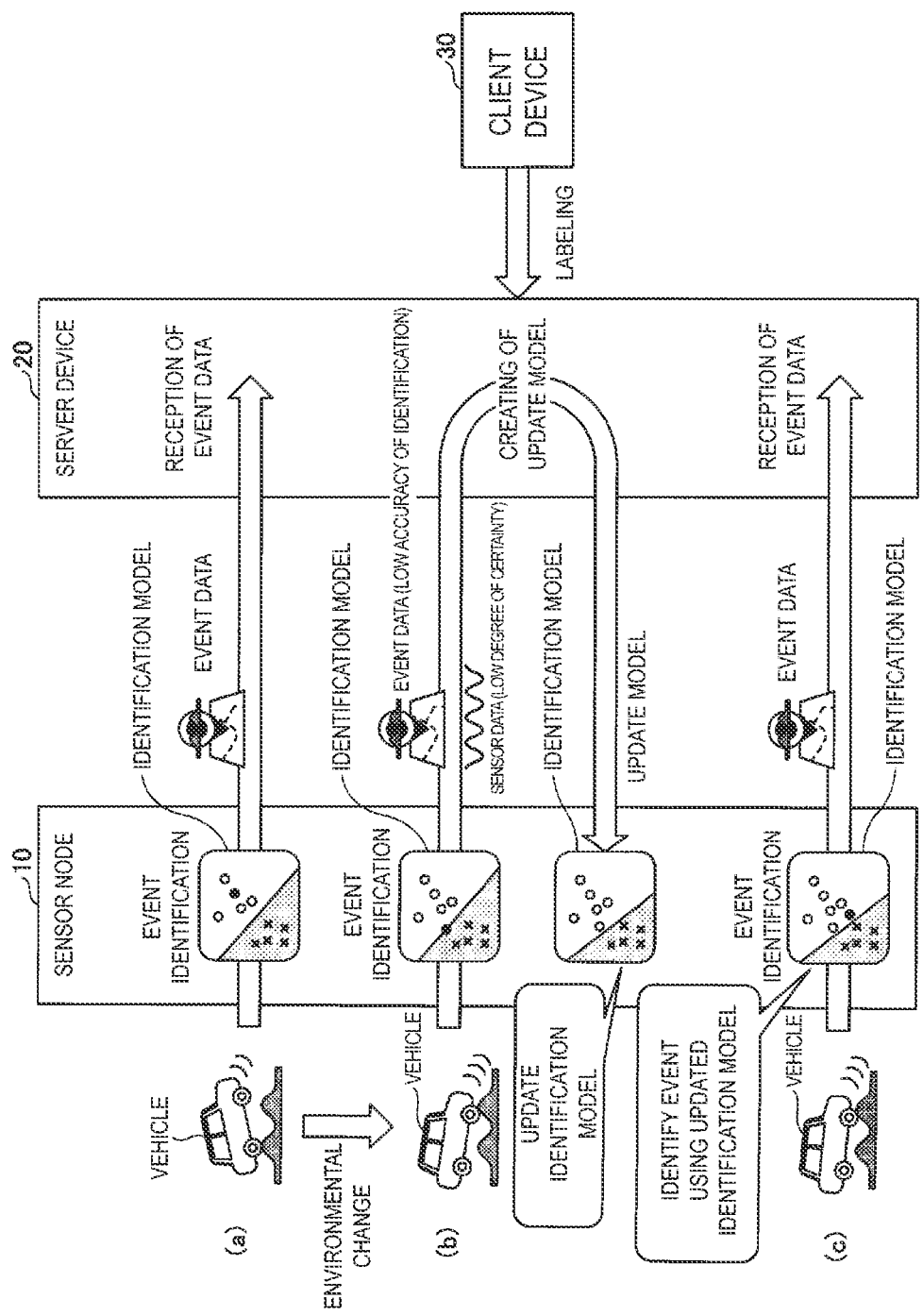
FIG. 4 is a diagram illustrating an example of event identification using an identification model and the updating of the identification model.

Here, event identification and updating of an identification model in a case where a road is set as a target and an event regarding whether or not a road surface has been damaged is identified will be described with reference to FIG. 4. FIG. 4 is a diagram illustrating an example of event identification using an identification model and the updating of the identification model. In the example illustrated in FIG. 4, it is assumed that a vehicle is the sensor node 10, and a sensor mounted on the sensor node 10 senses the vibration and the like of the vehicle.

As illustrated in FIG. 4($a$), the sensor node 10 acquires sensor data from the sensor and performs event identification (that is, identification regarding whether or not a road surface has been damaged) using the sensor data and an identification model created in advance. Then, in a case where an identification result thereof indicates that the road surface has been damaged, the sensor node 10 transmits event data including the identification result to the server device 20. Here, the event data may include, for example, information indicating the latitude and longitude of a damaged location, a numerical value obtained by calculating the magnitude of the damage, and the like, in addition to the above-described identification result (that is, information indicating that the road surface has been damaged). Thereby, the server device 20 can efficiently collect various information on a location where the road surface is damaged.

Here, for example, in a case where environmental changes such as change of a driver, replacement of a tire, deterioration of a sensor, and displacement of the installation location of the sensor have occurred, sensor values of sensor data vary. For this reason, as described above, the accuracy of identification in the identification model described above (the identification model used for event identification in FIG. 4($a$)) may be reduced (that is, the degree of certainty of sensor data used for event identification may be reduced).

In such a case, as illustrated in FIG. 4($b$), the sensor node 10 transmits sensor data having a low degree of certainty to the server device 20 as a labeling target. Then, the user performs labeling on sensor data held by the server device 20 to create training data by using the client device 30.

Thereafter, the server device 20 creates an update model using the training data and then transmits the update model to the sensor node 10. Thereby, the identification model held by the sensor node 10 is updated by the update model, so that it is also possible to perform event identification corresponding to environmental changes.

Hereinafter, as illustrated in FIG. 4($c$), the sensor node 10 performs event identification using sensor data acquired from the sensor and the identification model updated in FIG. 4($c$). Thereby, it is possible to perform event identification with a high accuracy of identification even after environmental changes have been made. Further, in the embodiment of the present disclosure, sensor data having a low degree of certainty is selected by an active learning method in FIG. 4($b$) described above, and then the selected sensor data is transmitted from the sensor node 10 to the server device 20 as a labeling target. For this reason, it is possible to suppress the amount of communication of the sensor node 10 as compared to a case where all of the pieces of sensor data are transmitted to the server device 20 as labeling targets, and it is possible to create an identification model capable of achieving a high accuracy of identification even with a small number of pieces of training data (sensor data having a label imparted thereto). In addition, the number of pieces of sensor data to be labeled is also reduced, and thus it is possible to reduce manpower costs of labeling.

Method of Selecting Sensor Data to be Labeled

Here, as described above, a method called active learning is used to select sensor data having a low degree of certainty. The active learning is a method of making it possible to create an identification model having a high accuracy of identification at low cost by preferentially selecting data having a good learning effect at the time of labeling data used for supervised learning to create training data.

In the embodiment of the present disclosure, a method called uncertainly sampling is used as a query strategy for active learning (that is, a strategy regarding which data is selected (sampled)). The uncertainly sampling is a query strategy based on the idea that the accuracy of identification of an identification model created using training data will be increased by imparting a label to the most uncertain data to set the data as the training data. In the embodiment of the present disclosure, an indicator representing the uncertainty is set as the degree of certainty. Data having a lower degree of certainty becomes a candidate for labeling, while it is assumed that data having a high degree of certainty does not need to be labeled.

Various methods of calculating the degree of certainty are conceivable. For example, a method called margin sampling can be used. In margin sampling, calculation is performed by assuming x to be data (that is, sensor data) and assuming the degree of certainty of x to be $P(y_1|x)-P(y_2|x)$. Here, $y_1$ is the label of a class into which there is the highest probability of x being classified, and $y_2$ is the label of a class into which there is the highest probability that x is classified. That is, a value obtained by subtracting a posterior probability $P(y_2|x)$ of a class into which there is the second highest probability of x being classified from a posterior probability $P(y_1|x)$ of the class into which there is the highest probability of x being classified is taken as the degree of certainty. Then, in the margin sampling, data (that is, sensor data to be labeled) x* is selected according to the following Equation (1).

[Math. 1]

$$x^* = \underset{x}{\mathrm{argmin}}(P(y_1 \mid x) - P(y_2 \mid x)) \tag{1}$$

Thereby, as the degree of certainty decreases (that is, a difference between $P(y_1|x)$ and $P(y_2|x)$ decreases (this means that an identification result becomes more uncertain)), x is more likely to be selected as a labeling target.

Note that, instead of the margin sampling, for example, least confident for selecting data having a lowest probability of "maximum probability label", and entropy-based approach for selecting data having the highest entropy, or the like may be used.

Functional Configuration

Figure 5:
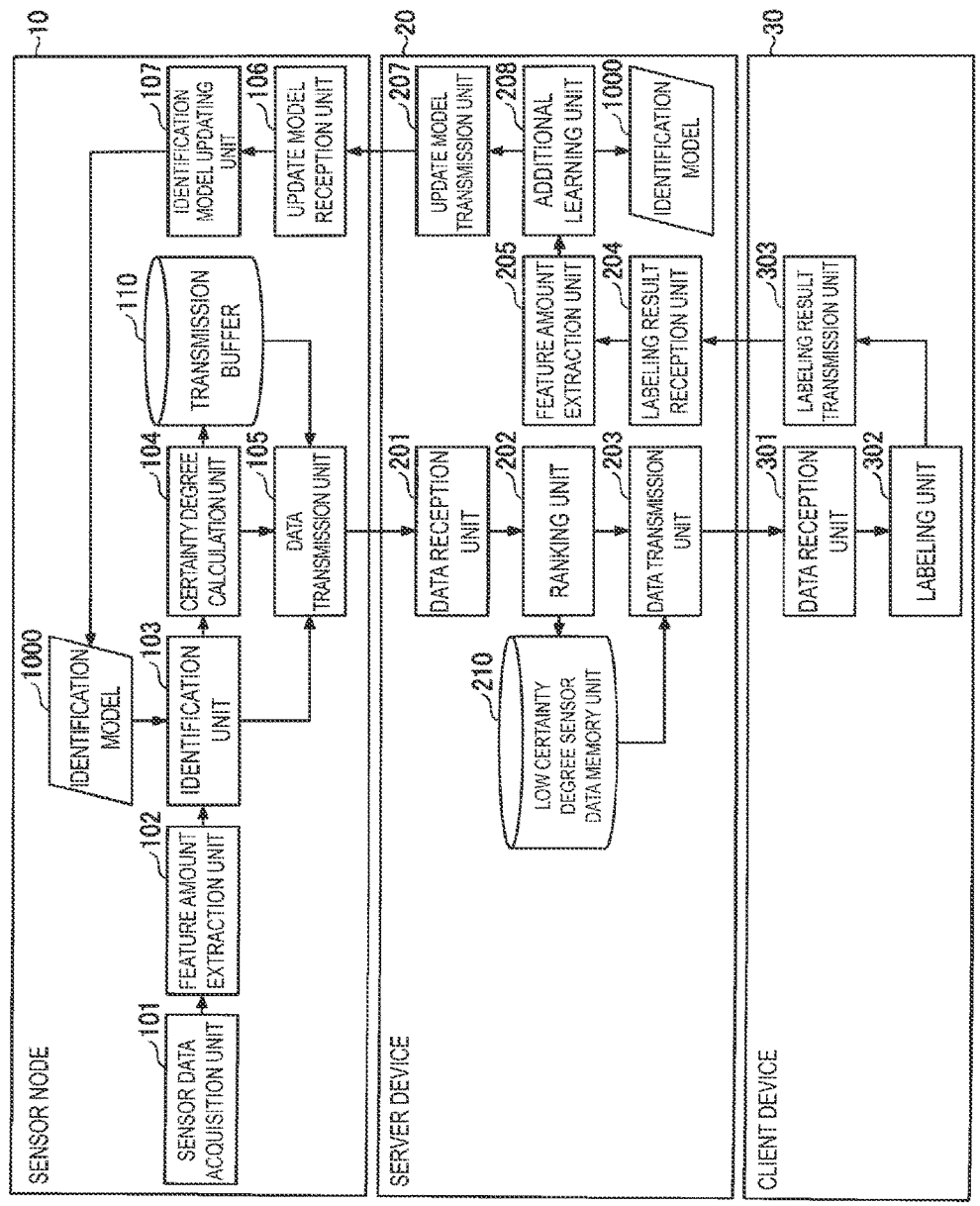
FIG. 5 is a diagram illustrating an example of a functional configuration of the identification system according to the embodiment of the present disclosure.

Next, a functional configuration of the identification system 1 according to the embodiment of the present disclosure will be described with reference to FIG. 5. FIG. 5 is a diagram illustrating an example of a functional configuration of the identification system 1 according to the embodiment of the present disclosure.

Sensor Node 10

As illustrated in FIG. 5, the sensor node 10 according to the embodiment of the present disclosure includes a sensor data acquisition unit 101, a feature amount extraction unit 102, an identification unit 103, a certainty degree calculation unit 104, a data transmission unit 105, an update model reception unit 106, and an identification model updating unit 107 as functional units. For example, the functional units may be implemented by processing executed by the processor 12 with a program installed in the sensor node 10.

In addition, the sensor node 10 according to the embodiment of the present disclosure includes a transmission buffer 110 as a memory unit. The memory unit can be implemented using, for example, the memory 13.

The sensor data acquisition unit 101 acquires sensor data from the sensor 11. Note that the sensor data is created by sensing a predetermined target by the sensor 11, and for example, may be represented by sensor values within a predetermined time section in time series.

The feature amount extraction unit 102 extracts a predetermined feature amount from the sensor data acquired by the sensor data acquisition unit 101. Here, which feature amount is extracted from the sensor data depends on, for example, an event to be identified, the type of identification model, or the like.

The identification unit 103 performs event identification on sensor data corresponding to the feature amount extracted by the feature amount extraction unit 102 using the feature amount and an identification model 1000 created in advance. That is, the identification unit 103 performs event identification on the sensor data corresponding to the feature amount, for example, by calculating a probability of a class into which the feature amount is classified by the identification model 1000. Note that the identification model 1000 is stored in, for example, the memory 13 or the like.

The certainty degree calculation unit 104 calculates the degree of certainty of the sensor data corresponding to the feature amount extracted by the feature amount extraction unit 102 (that is, the sensor data acquired by the sensor data acquisition unit 101). Then, in the case where the calculated degree of certainty is less than a maximum degree of certainty of the sensor data stored in the transmission buffer 110, the certainty degree calculation unit 104 deletes the sensor data having the maximum degree of certainty from the transmission buffer 110 and stores the sensor data corresponding to the calculated degree of certainty in the transmission buffer 110.

The data transmission unit 105 transmits, for example, event data including an identification result of event identification performed by the identification unit 103 to the server device 20 in accordance with the identification result.

In addition, the data transmission unit 105 transmits sensor data having a minimum degree of certainty to the server device 20 among pieces of sensor data stored in the transmission buffer 110, for example, in a case where there is space in a communication band. Here, the data transmission unit 105 transmits the degree of certainty of the sensor data to the server device 20 together with the sensor data. Thereby, sensor data having a low degree of certainty is transmitted to the server device 20 as a labeling target.

The update model reception unit 106 receives an update model transmitted from the server device 20. In a case where an update model is received by the update model reception unit 106, the identification model updating unit 107 updates an identification model 100 using the update model.

The transmission buffer 110 stores sensor data which is a candidate to be transmitted to the server device 20. The transmission buffer 110 may store, for example, sensor data in association with the degree of certainty calculated by the certainty degree calculation unit 104.

Server Device 20

As illustrated in FIG. 5, the server device 20 according to the embodiment of the present disclosure includes a data reception unit 201, a ranking unit 202, a data transmission unit 203, a labeling result reception unit 204, a feature amount extraction unit 205, an additional learning unit 206, and an update model transmission unit 207 as functional units. For example, the functional units may be implemented by processing executed by the processor 26 with one or more programs installed in the server device 20.

In addition, the server device 20 according to the embodiment of the present disclosure includes a low certainty degree sensor data memory unit 210 as a memory unit. The memory unit can be implemented using, for example, the auxiliary storage device 28.

The data reception unit 201 receives sensor data (and the degree of certainty of the sensor data) transmitted from the sensor node 10.

In a case where the sensor data (and the degree of certainty of the sensor data) is received by the data reception unit 201, the ranking unit 202 stores the sensor data in the low certainty degree sensor data memory unit 210 in ascending order of the degree of certainty. That is, the ranking unit 202 stores the sensor data in the low certainty degree sensor data memory unit 210 and then ranks the sensor data stored in the low certainty degree sensor data memory unit 210 in ascending order of the degree of certainty (that is, rearranges the sensor data in ascending order of the degree of certainty).

The data transmission unit 203 transmits the sensor data memorized in the low certainty degree sensor data memory unit 210 to the client device 30. In this case, the data transmission unit 203 transmits the sensor data to the client device 30 while maintaining the ranking of the degree of certainty. Note that the data transmission unit 203 may transmit the sensor data to the client device 30, for example, in response to a request received from the client device 30.

The labeling result reception unit 204 receives labeling results (that is, a set of training data (sensor data having a label imparted thereto)) transmitted from the client device 30.

In a case where the labeling results are received by the labeling result reception unit 204, the feature amount extraction unit 205 extracts a predetermined feature amount from sensor data included in these labeling results (that is, the training data).

The additional learning unit 206 performs additional learning of the identification model 1000 to create an update model by using the feature amount extracted by the feature amount extraction unit 205 and the label imparted to the sensor data corresponding to the feature amount. That is, the additional learning unit 206 creates an update model by inputting the feature amount and performing additional learning of the identification model by a supervised learning method using the label imparted to the sensor data corresponding to the feature amount as correct answer data.

The update model transmission unit 207 transmits the update model created by the additional learning unit 206 to the sensor node 10.

The low certainty degree sensor data memory unit 210 stores sensor data to be labeled. The low certainty degree sensor data memory unit 210 stores sensor data in a ranking format in ascending order of the degree of certainty (for example, in descending order of the degree of certainty) as described above.

Client Device 30

As illustrated in FIG. 5, the client device 30 according to the embodiment of the present disclosure includes a data reception unit 301, a labeling unit 302, and a labeling result transmission unit 303 as functional units. For example, the functional units may be implemented by processing executed by the processor 26 with one or more programs installed in the client device 30.

The data reception unit 301 receives sensor data (that is, sensor data in which the degree of certainty is ranked in ascending order) transmitted from the server device 20.

In a case where the sensor data is received by the data reception unit 301, the labeling unit 302 may perform labeling on these sensor data, for example, in response to the user's operation. Here, the labeling unit 302 may display the sensor data received by the data reception unit 301, for example, in a ranking format on a user interface (UI). Then, the labeling unit 302 performs labeling on each piece of sensor data in response to the user's labeling operation on the UI. In this case, sensor data to be labeled is displayed on the UI in a ranking format in ascending order of the degree of certainty, and thus the user can preferentially perform labeling on sensor data having a lower degree of certainty (that is, sensor data having a better learning effect). Thereby, training data in which a label is imparted to the sensor data is created. Note that the user does not need to perform labeling on all of the pieces of sensor data displayed on the UI, and may perform labeling on only some of the sensor data. For example, the user may perform labeling on only sensor data in a range in which the user himself or herself can perform labeling (for example, a range in which a label is known, a range in which costs are able to be dealt with, or the like).

In a case where the labeling of the sensor data is performed by the labeling unit 302, the labeling result transmission unit 303 transmits these labeling results (that is, a set of training data which is sensor data having a label imparted thereto) to the server device 20. Thereby, as described above, additional learning of the identification model 1000 is performed using these training data to create an update model. Note that, in a case where labeling is performed on only some of all of the pieces of sensor data displayed on the UI, additional learning of the identification model 1000 is performed using labeling results of some of the sensor data to create an update model. Even when the labeling results of some of the sensor data are used, it is possible to create an update model with an improved accuracy of identification of the identification model 1000 by additional learning.

Details of Processing

Next, details of processing executed by the identification system 1 according to an embodiment of the present disclosure will be described.

Figure 6:
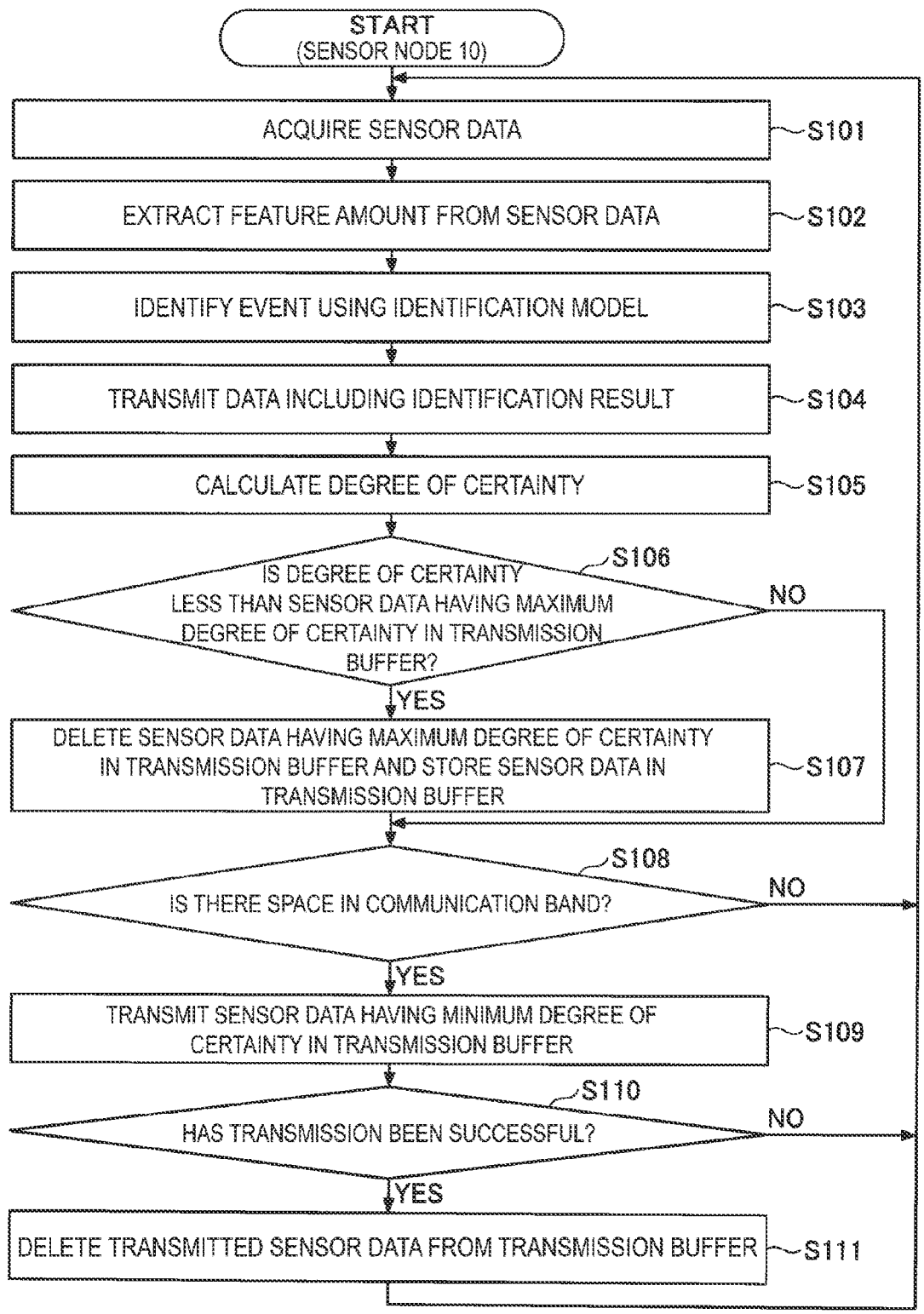
FIG. 6 is a diagram illustrating an example of a procedure from event identification using an identification model to transmission of sensor data to be labeled.

From Event Identification Using Identification Model to Transmission of Sensor Data to be Labeled Hereinafter, a procedure in a case where the sensor node 10 performs event identification using the identification model 1000 and transmits sensor data to be labeled to the server device 20 will be described with reference to FIG. 6. FIG. 6 is a diagram illustrating an example of a procedure from event identification using an identification model to the transmission of sensor data to be labeled. Note that the following procedures are executed by the sensor node 10.

The sensor data acquisition unit 101 acquires sensor data from the sensor 11 (step S101). Note that the sensor data acquisition unit 101 acquires the sensor data from the sensor 11 at predetermined time intervals. In this case, the sensor data acquisition unit 101 may acquire, for example, sensor data in certain degrees of units (for example, a predetermined number of pieces of sensor data, sensor data for a predetermined time period, or the like). The process of step S102 and the subsequent processes are executed each time sensor data is acquired by the sensor data acquisition unit 101.

Next, the feature amount extraction unit 102 extracts a predetermined feature amount from the sensor data acquired in step S101 described above (step S102).

Next, the identification unit 103 performs event identification of sensor data corresponding to the feature amount extracted in step S102 using the feature amount and the identification model 1000 created in advance (step S103).

Next, for example, in a case where an event identified in step S103 described above is a predetermined event, the data transmission unit 105 transmits event data including the identification results to the server device 20 (step S104). Note that the data transmission unit 105 may transmit event data including the identification results to the server device 20, for example, regardless of what kind of event the event identified in step S103 described above is.

Next, the certainty degree calculation unit 104 calculates the degree of certainty of the sensor data corresponding to the feature amount extracted in step S102 described above (step S105). That is, for example, when sensor data is assumed to be "x", the certainty degree calculation unit 104 calculates the degree of certainty of the sensor data x by $P(y_1|x)-P(y_2|x)$ using the probabilities $P(y_1|x)$ and $P(y_2|x)$ included in the identification results obtained in step S103 described above.

Next, the certainty degree calculation unit 104 determines whether the degree of certainty calculated in step S105 described above is less than a maximum degree of certainty of the sensor data stored in the transmission buffer 110 (step S106). Then, in accordance with a determination that the degree of certainty calculated in step S105 described above is less than the maximum degree of certainty (YES in step S106), the certainty degree calculation unit 104 deletes the sensor data having the maximum degree of certainty from the transmission buffer 110 and stores the sensor data acquired in step S101 described above in the transmission buffer 110 in association with the degree of certainty calculated in step S105 described above (step S107). Note that in accordance with a determination of NO in step S106, the process of step S107 is not executed.

Next, the data transmission unit 105 determines whether or not there is space in a communication band (step S108). That is, the data transmission unit 105 determines whether or not there is such a margin in the communication band that sensor data (and the degree of certainty thereof) may be transmitted to the server device 20. Then, in accordance with a determination that there is a margin in the communication band (YES in step S108), the data transmission unit 105 transmits sensor data having a minimum degree of certainty (and the degree of certainty thereof) among the sensor data stored in the transmission buffer 110 to the server device 20 (step S109). This means that sensor data to be labeled is selected from among the sensor data stored in the transmission buffer 110 by Equation (1) described above. Note that, in accordance with a determination of NO in step S108, the processing returns to step S101.

Subsequently to step S109, the data transmission unit 105 determines whether or not the transmission in step S109 described above has been successful (step S110). Then, in accordance with a determination that the transmission in step S109 described above has been successful (YES in step S110), the data transmission unit 105 deletes the transmitted sensor data from the transmission buffer 110 (step S111). Note that, in accordance with a determination of NO in step S110, the processing returns to step S101.

Note that, in the embodiment of the present disclosure, a case where one piece of sensor data is deleted in step S111 described above after one piece of sensor data is transmitted in step S109 described above has been described, but the present disclosure is not limited thereto, and the transmission and deletion of sensor data may be performed in certain degrees of units. For example, after a predetermined number of pieces of sensor data may be deleted in step S111 described above after this sensor data is transmitted in step S109 described above, or sensor data for a predetermined time period may be deleted in step S111 described above after this sensor data is transmitted in step S109 described above.

As described above, the sensor nodes 10 according to the embodiment of the present disclosure select sensor data having a lowest degree of certainty from among the sensor data stored in the transmission buffer 110 and transmit the selected sensor data to the server device 20. Thus, the sensor node 10 according to the embodiment of the present disclosure can transmit only sensor data having a good learning effect to the server device 20 as a labeling target, and consequently the amount of communication with the server device 20 can be reduced.

Note that, in the procedure illustrated in FIG. 6 described above, processing for selecting and transmitting a labeling target (step S105 to step S111) is performed on-line every time sensor data is acquired (step S101), but the present disclosure is not limited thereto, and for example, processing for selecting and transmitting a labeling target may be performed in batches. Alternatively, for example, processing for selecting and transmitting a labeling object may be performed only in a case where a specific event is identified in step S103.

Procedure from Reception to Storage of Sensor Data to be Labeled

Figure 7:
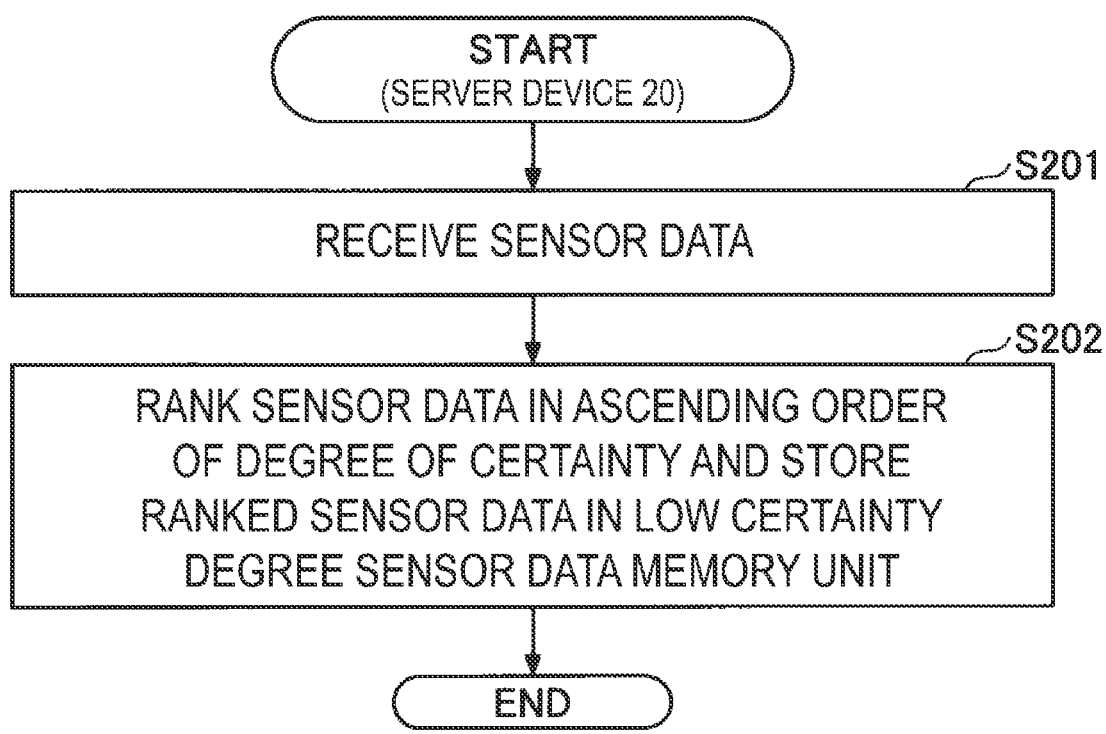
FIG. 7 is a diagram illustrating an example of a procedure from reception of sensor data to be labeled to storage of the sensor data.

Hereinafter, a procedure in a case where sensor data (and the degree of certainty thereof) is received by the server device 20 and is stored in the low certainty degree sensor data memory unit 210 will be described with reference to FIG. 7. FIG. 7 is a diagram illustrating an example of a procedure from the reception to storage of sensor data to be labeled. Note that the following procedures are executed by the server device 20.

The data reception unit 201 receives sensor data (and the degree of certainty of the sensor data) transmitted from the sensor node 10 (step S201).

Next, the ranking unit 202 stores the sensor data received in step S201 described above in the low certainty degree sensor data memory unit 210 in ascending order of the degree of certainty (step S202). That is, the ranking unit 202 stores the sensor data in the low certainty degree sensor data memory unit 210 and then ranks the sensor data stored in the low certainty degree sensor data memory unit 210 in ascending order of the degree of certainty.

Note that the ranking of the degrees of certainty in ascending order is an example, and the ranking unit 202 may perform ranking in ascending order or descending order (or in any order) of any indicators using, for example, the indicators other than the degree of certainty, in addition to performing ranking in ascending order of the degree of certainty.

As described above, in a case where the server device 20 according to the embodiment of the present disclosure receives sensor data to be labeled from the sensor node 10, the server device 20 stores the sensor data in the low certainty degree sensor data memory unit 210 in ascending order of the degree of certainty. Thereby, the low certainty degree sensor data memory unit 210 stores sensor data in a ranking format in ascending order of the degree of certainty.

Note that ranking does not necessarily need to be performed in step S202 described above. For example, when sensor data is displayed in the client device 30, the client device 30 may rank the sensor data in ascending order of the degree of certainty.

From Labeling of Sensor Data to Update of Identification Model

Figure 8:
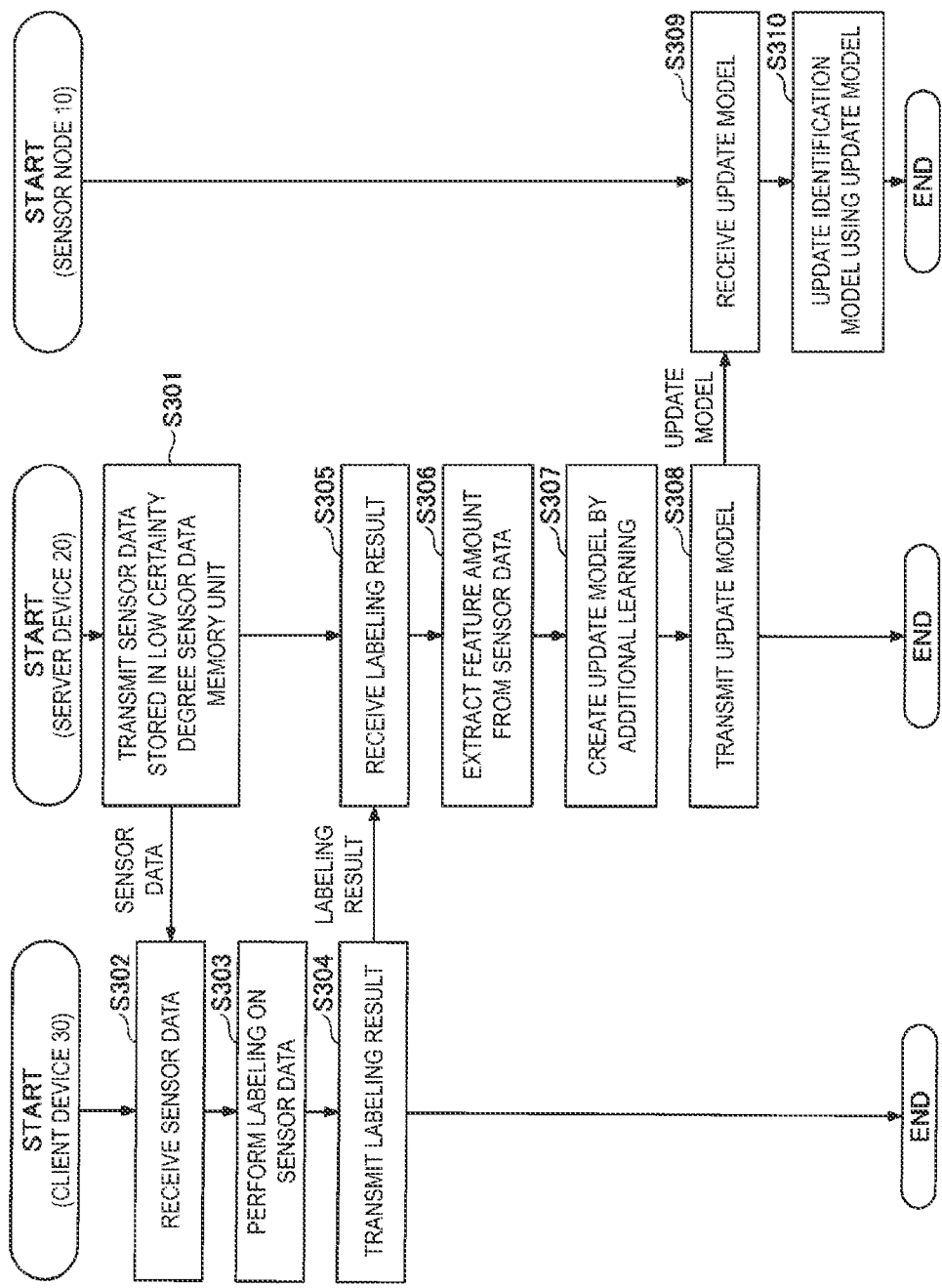
FIG. 8 is a diagram illustrating an example of a procedure from labeling of sensor data to updating of an identification model.

Hereinafter, a procedure from when the client device 30 performs labeling on sensor data to create training data to when the sensor node 10 updates an identification model will be described with reference to FIG. 8. FIG. 8 is a diagram illustrating an example of a procedure from the labeling of sensor data to the updating of an identification model.

The data transmission unit 203 of the server device 20 transmits the sensor data memorized in the low certainty degree sensor data memory unit 210 to the client device 30 (step S301). In this case, the data transmission unit 203 transmits the sensor data to the client device 30 while maintaining the ranking of the degree of certainty.

The data reception unit 301 of the client device 30 receives the sensor data transmitted from the server device 20 (step S302).

Next, the labeling unit 302 of the client device 30 performs labeling on the sensor data received in step S302 described above in response to the user's operation (step S303). Here, for example, the labeling unit 302 may display the sensor data received in step S302 described above on the UI in a ranking format in ascending order of the degree of certainty. Then, the labeling unit 302 performs labeling on each piece of sensor data in response to the user's labeling operation performed on the UI. Thereby, the user can preferentially perform labeling on sensor data having a lower degree of certainty (that is, sensor data having a higher learning effect).

Note that sensor data ranked in ascending order or descending order (or in any order) of any indicators may be displayed on the UI, in addition to a case where sensor data ranked in ascending order of the degree of certainty is displayed on the UI as described above.

Next, the labeling result transmission unit 303 of the client device 30 transmits the labeling results in step S303 described above (that is, a set of training data which is sensor data having a label imparted thereto) to the server device 20 in response to, for example, the user's labeling completion operation (step S304).

The labeling result reception unit 204 of the server device 20 receives the labeling results (that is, a set of training data) transmitted from the client device 30 (step S305).

Next, the feature amount extraction unit 205 of the server device 20 extracts a predetermined feature amount from the sensor data included in the labeling results (that is, training data) received in step S305 described above (step S306).

Next, the additional learning unit 206 of the server device 20 performs additional learning of the identification model 1000 to create an update model using the feature amounts extracted in step S306 described above and the labels imparted to the sensor data corresponding to the feature amounts (step S307).

Next, the update model transmission unit 207 of the server device 20 transmits the update model created in step S307 described above to the sensor node 10 (step S308).

The update model reception unit 106 of the sensor node 10 receives the update model transmitted from the server device 20 (step S309).

Next, the identification model updating unit 107 of the sensor node 10 updates the identification model 1100 using the update model received in step S309 described above (step S310).

As described above, in the identification system 1 according to the embodiment of the present disclosure, sensor data ranked in ascending order of the degree of certainty is displayed in the client device 30, and the user can perform labeling on the displayed sensor data. For this reason, the user can preferentially perform labeling on sensor data having a low degree of certainty (that is, sensor data having a good learning effect). Thus, even when there are a small number of pieces of sensor data to be labeled, it is possible to perform labeling effective in learning and to efficiently create an update model with little effort.

Examples

Next, an example of the embodiment of the present disclosure will be described. In the present example, a business vehicle is set as the sensor node 10, and a motion sensor (an acceleration sensor and a gyroscopic sensor) is mounted on the business vehicle. Then, it is assumed that it is identified whether or not a work machine is running by power take-off (PTO) from sensor data of the motion sensor. Note that environmental changes due to long-time use of a business vehicle are originally assumed in the embodiment of the present disclosure, but sensor data of a plurality of vehicles of the same type is used in the present example.

Figure 9:
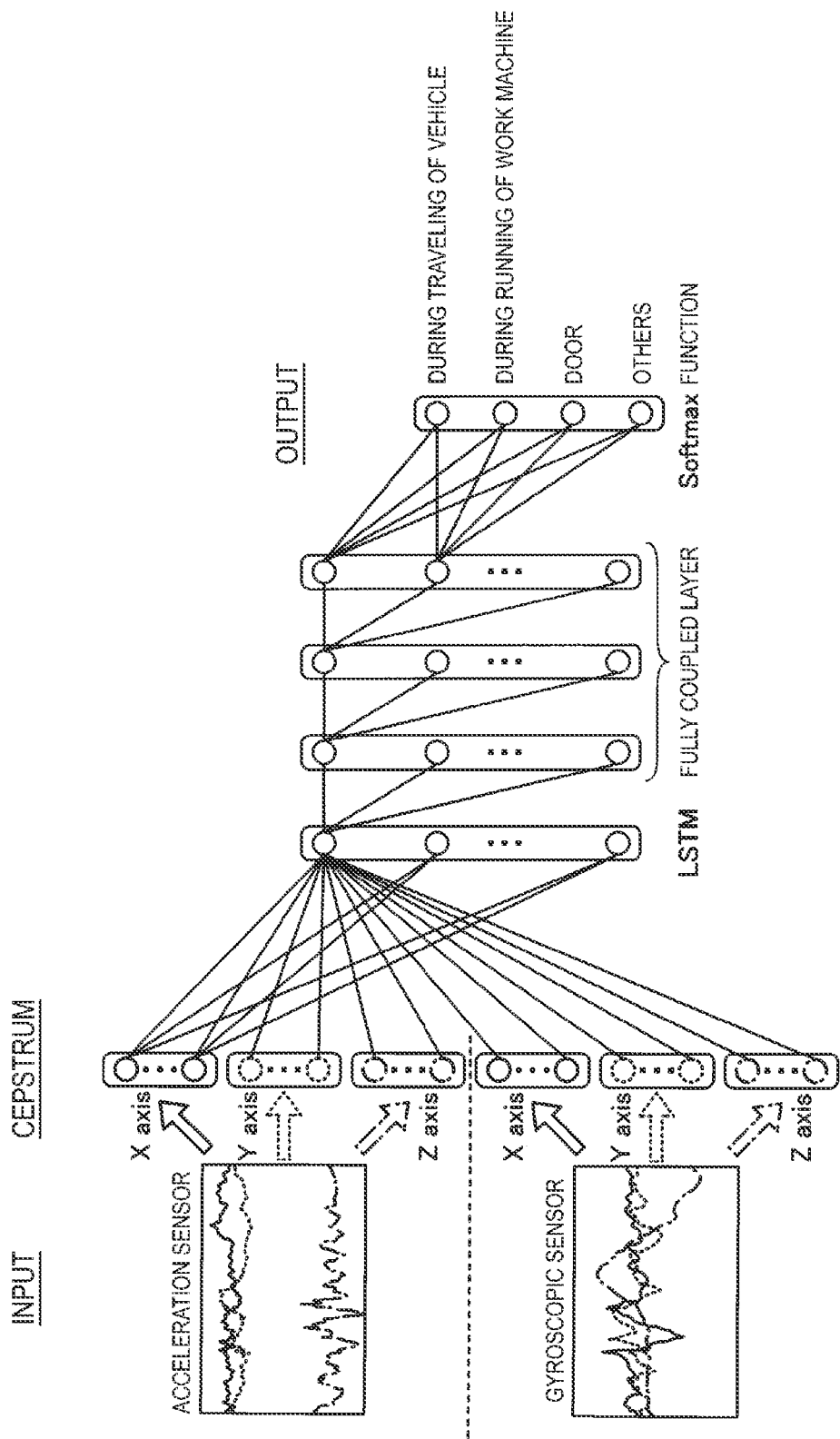
FIG. 9 is a diagram illustrating an example of an identification model realized by a deep neural network.

In the present example, a deep neural network (DNN) illustrated in FIG. 9 is used as an identification model. In the present example, sensor data of an acceleration sensor and sensor data of a motion sensor are acquired at 100 Hz and converted into LPC cepstrums on each of three axes. Cepstrums are obtained 30 times on each axis, and thus data to be input to the identification model illustrated in FIG. 9 is 180 cepstrums in total. Note that a cepstrum is used as an input to an identification model and a DNN is used as an identification model in the present example, but any feature amount such as a spectrogram or a moving average may be input, or any machine learning model such as an SVM may be used as an identification model as described above.

The identification model illustrated in FIG. 9 is constituted by a single-layered long short-term memory (LSTM), a three-layered fully coupled layer, and an output layer with a Softmax function as an activation function. The Softmax function calculates a probability that input data is classified into each of four classes ("during traveling of vehicle", "during running of work machine", "door", and "others"). Note that the class "door" is a class representing that, for example, the door of a business vehicle is opened or closed. Furthermore, the class "others" is a class representing that, for example, a business vehicle is stopped or idling.

In this case, when sensor data corresponding to five business vehicles is prepared in advance, learning of an identification model is performed using sensor data corresponding to four business vehicles, and event identification is performed using sensor data corresponding to the fifth business vehicle, the accuracy of identification in a case where sensor data is simply added in order from the center of a traveling time (simple method) is compared with the accuracy of identification in a case where sensor data is added in order of selection based on margin sampling of active learning. The comparison results are illustrated in FIGS. 10A and 10B.

Figure 10A:
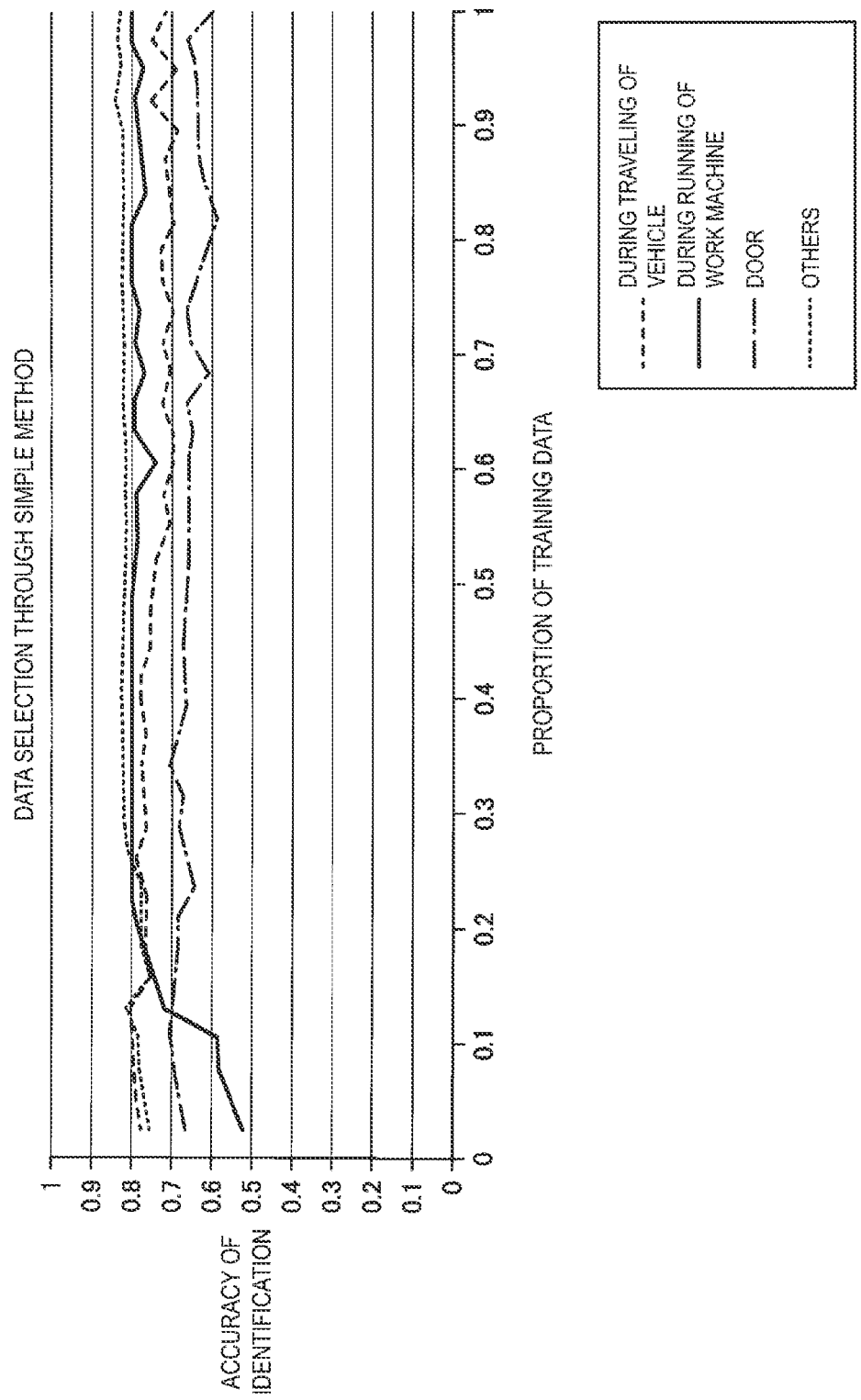
FIG. 10A is a diagram illustrating an example of effects of the present disclosure.

As illustrated in FIGS. 10A and 10B, there is no significant difference in an improvement in the final accuracy of identification between the simple method and the margin sampling. However, in the accuracy of identification particularly during the running of a work machine, it can be understood that the accuracy of identification is slowly improved in the simple method, while the accuracy of identification is improved even with a small amount of labeling (that is, even when the proportion of training data is low) in the margin sampling. In this manner, the accuracy of identification can be improved even with a small amount of data, and thus it is possible to cope with environmental changes even when the amount of data transmitted from the sensor node 10 to the server device 20 is small.

Note that the embodiment of the present disclosure can also be applied to, for example, the following examples in addition to the present example.

- A case where characteristics of a sound have changed due to the deterioration of a microphone cover when abnormality identification of a sound is performed outdoors or indoors
- A case where a typhoon passes and the direction of a microphone or the state of surrounding trees has changed when the natural environment is monitored outdoors using a sound such as birds chirping
- A case where a vibration pattern has changed due to a change in air pressure of a tire, the change of a driver, or the like when damage to a road surface is identified using an inertial sensor mounted on a vehicle
- A case where a positional deviation has occurred in an inertial sensor when the inertial sensor is attached to animal in a stock farm and it is monitored whether or not an abnormal action has occurred in the animal However, these examples are only examples, and additionally, the embodiment can also be applied to any example in which environmental changes occur when any event is identified by sensing various environments using a sensor.

CONCLUSION

As described above, the identification system 1 according to the embodiment of the present disclosure selects sensor data (that is, sensor data to be labeled) at the time of creating an update model for updating an identification model using an active learning method. Thereby, it is possible to create an update model capable of coping with environmental changes (that is, an identification model with a high accuracy of identification even after environmental changes has occurred) while suppressing the amount of data when the sensor node 10 transmits sensor data (and the degree of certainty thereof) to the server device 20. In addition, the number of pieces of sensor data to be labeled can be reduced, and thus it is possible to reduce manpower costs when the user performs labeling on the sensor data.

In this manner, in the identification system 1 according to the embodiment of the present disclosure, an identification model can be effectively updated even with limited power of the sensor node 10 or limited manpower costs of the user, and thus it is possible to perform stable environmental sensing over a long period of time.

Note that, in the embodiment of the present disclosure, a case where an update model is created using sensor data labeled by the user as training data has been described. However, for example, in a case where an update model can be created without a label, an update model may be automatically created in the server device 20 using sensor data transmitted from the sensor node 10.

The present disclosure is not limited to the disclosure of above-described embodiment, and various modifications and alterations may be made without departing from the scope of the claims.

REFERENCE SIGNS LIST

1 Identification system
10 Sensor node
20 Server device
30 Client device
101 Sensor data acquisition unit
102 Feature amount extraction unit
103 Identification unit
104 Certainty degree calculation unit
105 Data transmission unit
106 Update model reception unit
107 Identification model updating unit
110 Transmission buffer
201 Data reception unit
202 Ranking unit
203 Data transmission unit
204 Labeling result reception unit
205 Feature amount extraction unit
206 Additional learning unit
207 Update model transmission unit
210 Low certainty degree sensor data memory unit
301 Data reception unit
302 Labeling unit
303 Labeling result transmission unit
1000 Identification model

The invention claimed is:

1. A sensor node connected to a server device through a communication network, the sensor node comprising a processor configured to execute operations comprising:
   acquiring a piece of sensor data from a sensor in the sensor node;
   determining, based on an identification model, a class of the piece of sensor data, wherein the class is a part of a plurality of classes to identify occurrence of a predetermined event using the identification model created by the server device in advance;
   calculating a degree of certainty of the piece of sensor data being in the determined class;
   selecting the piece of sensor data among a plurality of sensor data from a transmission buffer, wherein the degree of certainty of the piece of sensor data indicates a minimum degree of certainty of being identified in the class of the plurality of classes among the plurality of sensor data stored in the transmission buffer, and the transmission buffer stores the sensor data and the degree of certainty of the sensor data in association with each other; and
   transmitting the selected piece of sensor data as training data to the server device for training the identification model.

2. The sensor node according to claim 1, wherein the calculating further comprises:
   comparing a maximum degree of certainty among the degrees of certainty of the sensor data stored in the transmission buffer with the calculated degree of certainty,
   deleting another piece of sensor data, wherein said another piece of sensor data indicates the maximum degree of certainty among degrees of certainty of the plurality of sensor data from the transmission buffer, and the calculated degree of certainty of the selected piece of sensor data is less than the maximum degree of certainty, and
   storing the calculated degree of certainty and the acquired sensor data in association with each other in the transmission buffer.

3. A server device connected to one or more sensor nodes through a communication network, the server device comprising a processor configured to execute operations comprising:
   training, based on training data, an identification model, wherein the identification model identifies occurrence of a predetermined type of event in a sensor node of the one or more sensor nodes;
   transmitting the identification model to the sensor node of the one or more sensor nodes through the communication network;
   receiving, from the sensor node of the one or more sensor nodes, one or more sensor data sensed by the sensor node of the one or more sensor nodes;
   receiving, from the sensor node of the one or more sensor nodes, indicators of respective sensor data of the one or more sensor data, wherein each indicator indicates a degree of certainty of being identified in the class of the plurality of classes, the degree of certainty is less than a predetermined threshold of an accuracy of identification, the class identifies occurrence of a predetermined event according to the identification model in the sensor node of the one or more sensor nodes;
   ranking the one or more sensor data in ascending order or descending order of the indicators;
   storing the ranked plurality of sensor data in a memory;
   outputting the ranked one or more sensor data to a user as a labeling target;
   performing additional learning of the identification model for identifying occurrence of the event in the sensor node using the plurality of sensor data labeled by the user; and
   transmitting, over the communication network, the learnt identification model to the sensor node for updating the identification model in the sensor node.

4. A method including:

acquiring, by a sensor node, a piece of sensor data from a sensor in the sensor node, wherein the sensor node is connected to a server device through a communication network;

determining, based on an identification model, a class of the piece of data, wherein the class is a part of a plurality of classes to identify occurrence of a predetermined event using the identification model created by the server device in advance;

calculating a degree of certainty of the piece of sensor data being in the determined class;

selecting the piece of sensor data from a transmission buffer, wherein the degree of certainty of the piece of sensor data indicates a minimum degree of certainty of being identified in the class of the plurality of classes among the plurality of sensor data stored in the transmission buffer, and the transmission buffer stores the sensor data and the degree of certainty of the sensor data in association with each other; and transmitting over the communication network the selected piece of sensor data as training data to the server device.

5. The method of claim 4, further comprising:

receiving a plurality of sensor data, by the server device, the plurality of sensor data is sensed by one of the one or more sensor nodes;

receiving indicators of respective sensor data of the plurality of sensor data, wherein each indicator indicates a degree of certainty of being identified in the class of the plurality of classes to identify occurrence of a predetermined event using an identification model in a sensor node of the one or more sensor nodes;

ranking, by the server device, the plurality of sensor data in ascending order or descending order of the indicators;

storing the ranked plurality of sensor data in a memory;

outputting the ranked plurality of sensor data to a user as a labeling target;

performing additional learning of an identification model for identifying occurrence of the event in the sensor node using the plurality of sensor data labeled by the user; and transmitting over the communication network the identification model having been subjected to the additional learning to at least one sensor node as an identification model for updating the identification model held by the sensor node.

* * * * *